United States Patent [19]

Chiu et al.

[11] 4,013,569

[45] Mar. 22, 1977

[54] AQUEOUS ANIONIC SURFACTANT SYSTEMS CONTAINING AROMATIC ETHER POLYSULFONATES

[75] Inventors: Ying C. Chiu; Harold J. Hill, both of Houston, Tex.

[73] Assignee: Shell Oil Company, Houston, Tex.

[22] Filed: Oct. 15, 1975

[21] Appl. No.: 622,576

Related U.S. Application Data

[63] Continuation-in-part of Ser. No. 562,283, March 26, 1975, Pat. No. 3,945,437.

[52] U.S. Cl. .......................... 252/8.55 D; 166/275; 252/353
[51] Int. Cl.² ........................................ E21B 43/22
[58] Field of Search ............ 252/8.55 D, 353, 553; 166/305 R, 275

[56] References Cited

UNITED STATES PATENTS

| | | | |
|---|---|---|---|
| 2,854,477 | 9/1958 | Steinhauer | 252/353 |
| 3,348,611 | 10/1967 | Reisberg | 166/274 X |
| 3,508,612 | 4/1970 | Reisberg et al. | 166/274 |
| 3,522,174 | 7/1970 | Reddie | 252/8.5 |
| 3,712,377 | 1/1973 | Hill et al. | 166/273 X |
| 3,768,560 | 10/1973 | Hill et al. | 166/274 |
| 3,811,505 | 5/1974 | Flournoy et al. | 252/8.55 X |
| 3,823,774 | 7/1974 | Chiu | 166/275 X |

*Primary Examiner*—Herbert B. Guynn

[57] ABSTRACT

An improved aqueous anionic surfactant system for providing low interfacial tensions against oil is formed by including an aromatic ether polysulfonate in the system. This improves the tolerance of the system toward salts of monovalent and/or multivalent cations, and also causes emulsions formed between the oil and the oil-displacing system to be less viscous and less stable.

8 Claims, 3 Drawing Figures

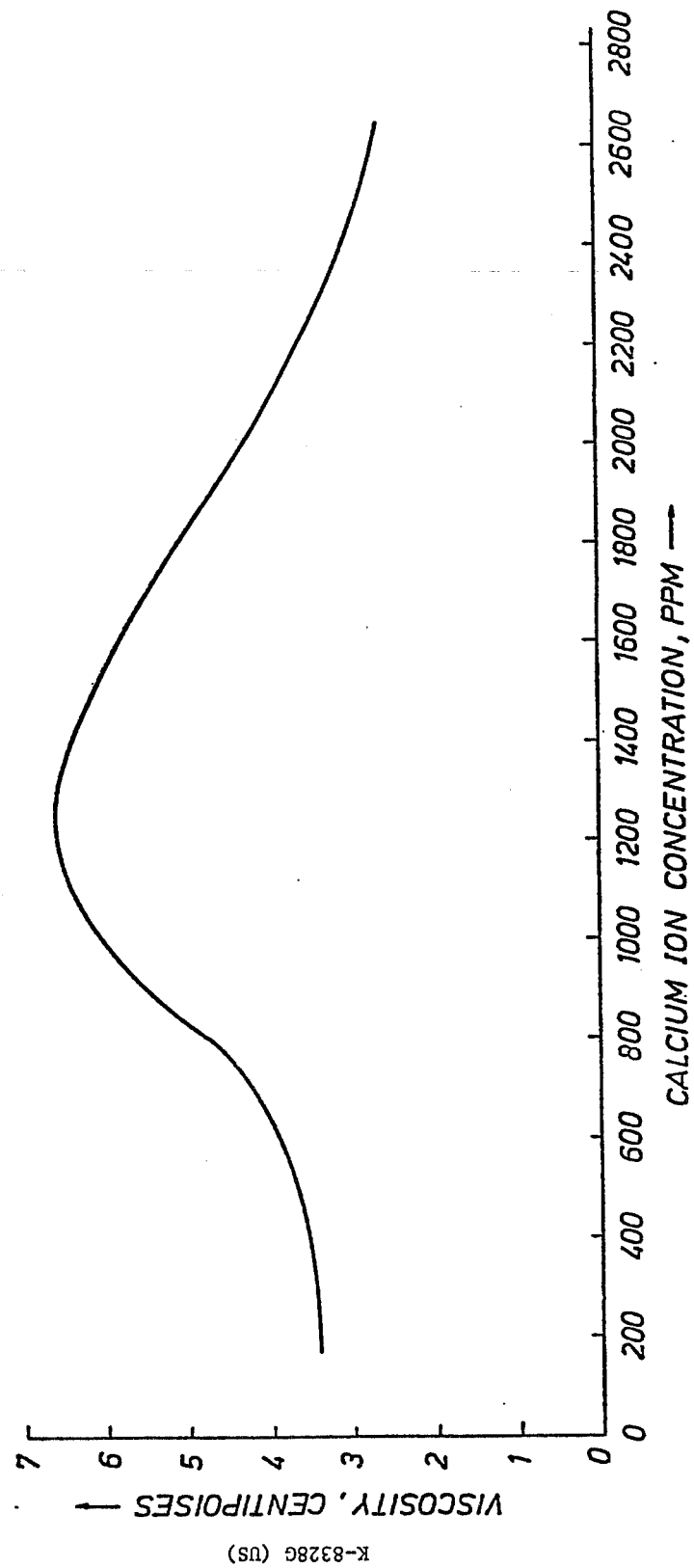

AQUEOUS ANIONIC SURFACTANT SYSTEMS CONTAINING AROMATIC ETHER POLYSULFONATES

This is a continuation-in-part of application Ser. No. 562,283, filed March 26, 1975 now U.S. Pat. No. 3,945,437.

BACKGROUND OF THE INVENTION

The invention relates to an aqueous anionic surfactant system capable of displacing oil within a permeable material such as a subterranean reservoir. This system is useful for displacing reservoir oil toward a location from which oil is produced, for displacing residual oil away from a well to improve injectivity, for forming a foam capable of temporarily diverting a fluid being injected into a permeable porous material, etc.

Aqueous anionic surfactant systems are known to be particularly efficient for displacing oil. An anionic surfactant system is a substantially homogeneous aqueous liquid composition that may comprise a solution, a microemulsion, or a micellar dispersion of anionic surfactant molecules and/or micelles. The water-solubilities and oil-solubilities of the surfactants in such a system are such that those materials tend to remain along an oil/water interface, rather than being completely dissolved or dispersed within either the water-phase or oil-phase components of the system. The anionic surfactants comprise surface active salts or soaps of organic or inorganic acids.

In a process for displacing oil, the surfactants in an aqueous anionic surfactant system can be pre-formed or formed within a permeable material such as a subterranean reservoir. The J. Reisberg U.S. Pat. No. 3,174,542 describes oil displacing processes in which acidic materials are injected ahead of basic materials so that surfactant systems are formed in situ. Pre-formed active aqueous petroleum sulfonate surfactant systems containing activity-enhancing concentrations of electrolytes are described in the J. Reisberg U.S. Pat. Nos. 3,330,344 and 3,348,611. Active aqueous anionic surfactant systems containing electrolytes, water thickening material, and chemicals selected for their ability to favorably modify emulsions formed between the oil and the oil-displacing surfactant system are described in the H. J. Hill and D. R. Thigpen U.S. Pat. Nos. 3,712,377 and 3,768,560.

Although aqueous anionic surfactant systems are generally efficient oil-displacing fluids they have relatively low tolerances to multivalent cations. Such cations are commonly encountered in waters or brines in subterranean reservoirs that contain solutions of calcium or magnesium salts, or the like. The multivalent cations tend to react with the anionic surfactants or the components of anionic surfactant systems to form precipitates, to cause phase separations, or the like.

Multivalent cation tolerance problems typical of aqueous anionic surfactant systems are discussed in patents such as the J. Reisberg, J. B. Lawson and G. Smith U.S. Pat. No. 3,508,612; the R. F. Farmer, J. B. Lawson and W. M. Sawyer, Jr. U.S. Pat. No. 3,675,716; etc. Those patents suggested improving the multivalent cation tolerance by dissolving co-surfactants, such as alkoxyalcohol sulfates in the systems. U.S. Pat. No. 3,799,264 suggests using surfactant systems that contain sulfated aliphatic anionic surfactants, nonionic surfactants, and a water-soluble guanidine salt, in order to provide an improved tolerance to multivalent cations.

Foams comprising a gas dispersed in an aqueous liquid can advantageously be used in various situations requiring either or both a good heat stability or a high multivalent cation tolerance. For example, U.S. Pat. No. 3,410,344 describes injecting steam through a well while maintaining a column of foam in the borehole to keep the steam from rising above a selected depth U.S. Pat. No. 3,412,793 describes injecting a steam foam (which preferably has a life expectancy that is dependent only on temperature) in order to plug a thief zone within a reservoir for a selected length of time. And, U.S. Pat. No. 3,637,021 describes uses of foams, which are heated to temperatures of from about 130° to 445° F, as borehole cleaning fluids, etc.

SUMMARY OF THE INVENTION

The present invention relates to an aqueous anionic surfactant system which contains a monomeric aromatic ether polysulfonate. The concentration of the polysulfonate is adjusted to (a) increase the salinity and multivalent cation tolerance of the system and/or (b) reduce the viscosity and stability of emulsions which can be formed between the system and an oil being displaced by the system without significantly reducing the oil displacing efficiency of the system.

DESCRIPTION OF THE DRAWINGS

FIG. 3 shows a plot of the viscosity change with increase in calcium ion concentration in a surfactant system of the present invention.

DESCRIPTION OF THE INVENTION

Figure 1:
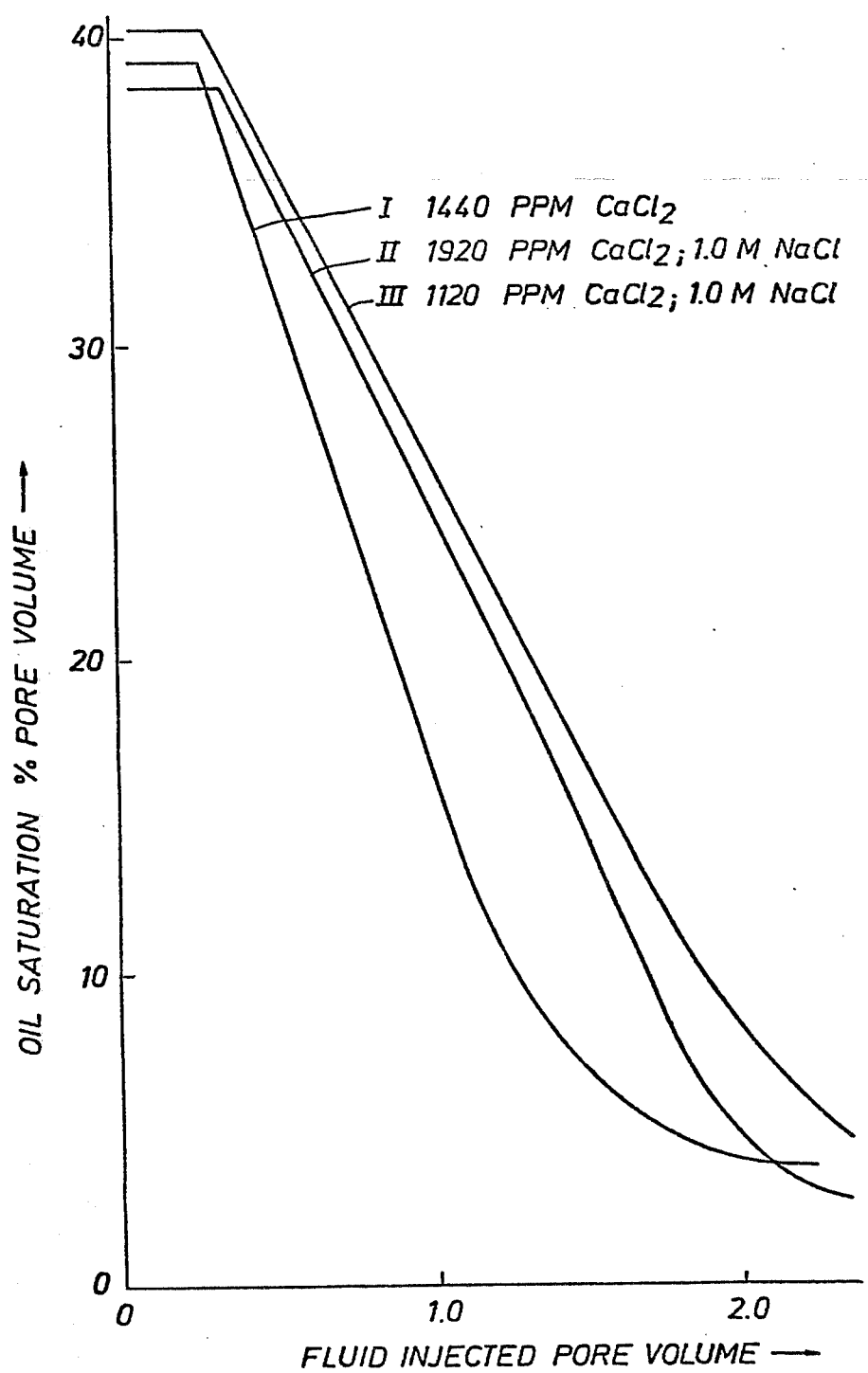
FIG. 1 shows a graph of the variation in oil saturation with an amount of chemical injected into oil-containing cores of Berea sandstones.

The present invention is at least in part premised on the following discovery. A relatively water-soluble aromatic ether polysulfonate can be dissolved in an active aqueous anionic surfactant system in proportions that increase both the multivalent cation and total salt tolerance of the system without causing a significant reduction in the oil-displacing efficiency of the system. And, when the system contains such an aromatic ether polysulfonate in such a proportion, the tendency for viscous or stable emulsions to be formed between the system and the oil is significantly reduced. This is not obvious. It is accomplished by materials which are not by themselves effective as oil-displacing surfactant materials and, since the aromatic ether polysulfonates are more heat stable than the alkoxyalcohol sulfates that were previously used to increase the salt tolerance of aqueous anionic surfactant systems, the systems containing the aromatic ether polysulfonates can be used at temperatures exceeding those at which the alkoxyalcohol sulfates can be used.

At temperatures below about 150° F, aqueous anionic surfactant systems that contain mixtures of both the aromatic ether polysulfonates and the alkoxyalcohol sulfates (a) have multivalent and total cation tolerances exceeding those of systems containing comparable amounts of only one of the additives, and (b) have oil-displacing efficiencies equaling those of systems containing either the ether polysulfonates or the alkoxyalcohol sulfates by themselves. In addition, such aromatic ether polysulfonates can be used in proportions such that the viscosity of the surfactant system may be high enough without the presence of a thickening agent such as a water-soluble polymer.

Aqueous anionic surfactant systems containing various surfactants such as petroleum sulfonates or mixtures of petroleum sulfonates with alkoxyalcohol or alkoxyalcohol sulfates often form emulsions between themselves and the oil and water being displaced in a permeable medium. Such emulsification problems and the use of emulsion modifiers to avoid the formation or ease the breaking of such emulsions is more completely discussed in U.S. Pat. Nos. 3,712,377 and 3,768,560 by H. J. Hill and D. R. Thigpen. The present surfactant systems which contain aromatic ether polysulfonates are comparatively resistant to the formation of stable or viscous emulsions. This is advantageous in avoiding a tendency for mixtures of the surfactant system and formation oil to be by-passed by driving fluids such as a thickened aqueous liquid for displacing it through the reservoir.

As known to those skilled in the art, in an oil-displacement process, the interfacial tension-lowering activity is particularly important. An "active" aqueous surfactant system, as used herein, is one in which the interfacial tension between it and oil is less than about 0.1 dyne per centimeter. The capability of a given co-surfactant or other additive to improve the multivalent and/or monovalent cation tolerance of an active petroleum sulfonate surfactant system without significantly reducing its activity, does not appear to be predictable. As indicated in U.S. Pat. No. 3,675,716, various alkoxyalcohol sulfate surfactants are effective at relatively low temperatures. But, nonionic or cationic surfactants are less desirable because of their tendency to reduce the activity, when used in the amounts required to achieve the desired salinity tolerance. Various types of sulfonates that have molecular weights in the range of surfactant materials and contain groups which might enhance their tolerance to multivalent cations have failed to be effective. Tests have been made of sulfonate surfactant materials containing unsaturated carbon-to-carbon bonds, aliphatic ether groups, hydroxy groups, and the like. Examples of compounds that seemed likely to be effective but either failed to adequately increase the multivalent cation tolerance or caused reductions in the interfacial tension lowering activity of the system include: the sodium salts of, respectively, alkyl naphthalene sulfonate, dodecyl benezene sulfonate, alpha-octene sulfonate, alpha-decene sulfonate, alpha-tetradecene sulfonate, commercially available water soluble petroleum sulfonates such as Witco Pyronate, and the like.

An aqueous anionic surfactant system suitable for use in the present invention can be substantially any such system that contains enough anionic surfactant material, with or without electrolytes, thickeners, and the like, to provide a surfactant system capable of displacing oil within a permeable material such as a subterranean reservoir. The aqueous petroleum sulfonate surfactant systems are preferred. Examples of suitable anionic surfactant materials include the tall oil pitch soap surfactants described in the Y. C. Chiu U.S. Pat. No. 3,823,774, the naphthenic acid soaps and/or petroleum sulfonates of the above-mentioned Reisberg, Hill and Thigpen patents, and the like.

Particularly suitable anionic surfactants comprise mixtures of relatively water-soluble and water-insoluble alkali metal salts of petroleum sulfonates (such as alkylaryl sulfonates, alkylated benezene sulfonates, and the like). For uses at temperatures below about 150° F, such mixtures can include sulfated polyoxyalkylated alcohol surfactants. Petroleum sulfonate surfactants are commercially available, for example, as Petronates and Pyronates from Witco Chemical Company; Promor Sulfonates from Mobil Oil Company; and the like. Surfactant sulfates of ethyoxylated primary alcohols are available as NEODOLS from Shell Chemical Company. Other surfactant sulfates of ethoxylated alcohols are available as Tergitols from Union Carbide, and the like.

Aromatic ether polysulfonates suitable for use in this invention can comprise substantially any preferentially water-soluble compounds that contain one ether group attached to at least one aromatic radical and contain at least substantially two sulfonate groups per molecule. The sulfonated alkyldiphenyl oxides of the type described (as electroplating bath spray-reducers) in U.S. Pat. No. 2,956,935, or mixtures of such compounds, are preferred. Particularly preferred aromatic ether polysulfonates comprise the Dowfax surfactants (available from Dow Chemical Company) having compositions of the type listed in Table 1. The compounds used in the present process are monomeric ethers as distinguished from the sulfonated poly(alkylated phenol) polymers of patents 3,308,883 and 3,530,938.

Table 1

DOWFAX SURFACTANTS

Basic Stucture

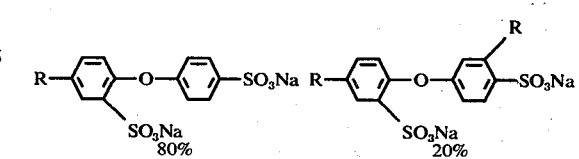

R = Hydrocarbon Chain

| Basic Properties Designation | R | Sulfonate per Molecule | Active Ingredient |
|---|---|---|---|
| Dowfax XD-8166 | C$_{16}$ Straight | 1.8 | 45% |
| Dowfax XD-8389 | C$_{14}$ Straight | 2.0 | 45% |
| Dowfax 2A1 | C$_{12}$ Branched | 2.0 | 45% |
| Dowfax XD-8214 | C$_{10}$ Straight | 1.8 | 37.7% |
| Dowfax 3B2 | C$_{10}$ Straight | 2.0 | 45% |

In oil displacement operations using the present systems at temperatures of less than about 150° F, the aromatic ether polysulfonates are advantageously mixed with alkoxyalcohol sulfate surfactants of the type described in U.S. Pat. No. 3,508,612. Such sulfates are typified by sulfates of ethoxylated aliphatic alcohols available from Shell Chemical Company under the trade name "NEODOLS". For example, NEODOL 25-3S comprises the sulfates of a mixture of alcohols that contain from about 12 to 15 carbon atoms and about three ethylene oxide groups per molecule.

The electrolyte content of the aqueous anionic surfactant systems of the present invention is preferably adjusted to enhance the interfacial tension-lowering activity of the systems at the temperatures at which the systems are to be used. Such temperatures are preferably in the order of from about 50° to 300° F. The adjusting can be done by dissolving water-soluble salts in the aqueous phase of the system, or making up the system by using a water or brine containing dissolved electrolytes, etc. The electrolytes in the present aqueous anionic surfactant system preferably consist essentially of alkali metal salts of halogen acids, but may include relatively small proportions of relatively high-soluble salts of alkaline earth metals. The sodium and potassium chlorides are particularly suitable electrolytes for use in the present invention. The electrolyte concentration of the aqueous liquid phase of a surfactant system of this invention is preferably from about 0.1 to 5 moles per liter.

Water thickeners can be used in, or in conjunction with, the present surfactant systems. Such thickeners can be substantially any water soluble natural or synthetic polymeric material, such as a carboxymethyl cellulose, a polyethylene oxide, a hydroxyethylcellulose, a partially hydrolized polyacrylamide; a copolymer of acrylamide and acrylic acid; biopolymers, such as the polysaccharides; or the like.

An oil in a permeable material can be displaced by injecting a surfactant system of the invention to contact and push the oil. The surfactant system can be preceded or followed by substantially any aqueous or oil-phase fluid with which it is compatible. Where a slug of the surfactant system is displaced through a reservoir (e.g., in a chemical flood process) it is preferably displaced by a thickened aqueous solution having a viscosity greater than (and/or a mobility less than) the surfactant system.

In situations in which there is a relatively strong tendency for an aqueous surfactant system to become emulsified with the oil and/or water being displaced, it may be desirable to incorporate an emulsion modifier into the system. Suitable emulsion modifiers include mono or polyamines, polyethoxylated amines, amides, sulfonamides of water soluble sulfonic acids, water-soluble oil-insoluble petroleum sulfonates, ketones, alcohols, and the like. The lower alcohols, such as the butyl alcohols, and the polyethoxylated amines, such as Ethoduomeens T/25 or T/20 are particularly suitable.

Table 2 lists compositions and properties of various active aqueous petroleum sulfonate surfactant systems of this invention at about 160° F (70° C). In the table, the "percent composition" corresponds to the parts by weight of the indicated component in about 100 parts of the aqueous liquid. The "active region" is the range of electrolyte concentration in which interfacial tension between the system and oil is less than 0.1 dyne per centimeter. Under "separation" is listed the molarity of the indicated salt (in the aqueous liquid phase of the surfactant system) at which the surfactant system separates into two distinct liquid phases. The "activity by screening" is the oil-displacement activity as indicated by emulsification tests in which the solutions being tested are mixed with crude oil and subjected to comparable agitation.

In the systems listed in Table 2, in order to compare different Dowfax surfactants, the proportion of petroleum sulfonate surfactant (Martinez 470) was kept at 4% (of commercial product) with each of the Dowfax surfactants being kept at 1.5% or 1.7% (of commercial product), which provides about 0.675% active ingredient in the system. As indicated in the table, the presence of the Dowfax aromatic ether polysulfonates increases the tolerance to the salts of both monovalent and multivalent cations.

Table 2

PETROLEUM SULFONATE-DOWFAX SYSTEM - 70° C

| Composition (% Based on Commercial Product) | Active Region | Separation | Activity by Screening |
|---|---|---|---|
| 5% Martinez 470 | 0.1 – 0.28 M NaCl | 0.32 M NaCl | Moderate |
| 5% Martinez 470 | 0.0125 – 0.015 M CaCl$_2$ | 0.0175 M CaCl$_2$ | Moderate |
| 4% Martinez 470, 1.5% Dowfax 3B2 | 1.0 – 1.8 M NaCl | 1.95 M NaCl | Moderate |
| 4% Martinez 470, 1.5% Dowfax 3B2 | 0.02 – 0.048 M CaCl$_2$ | 0.052 M CaCl$_2$ | Good |
| 4% Martinez 470, 1.5% Dowfax XD-8166 | 0.45 – 1.35 M NaCl | 1.5 M CaCl | Good |
| 4% Martinez 470, 1.5% Dowfax XD-8166 | 0.016 – 0.036 M CaCl$_2$ | 0.04 M CaCl$_2$ | Moderate |
| 4% Martinez 470, 1.5% Dowfax XD-8166 | 0.008 – 0.044 M CaCl$_2$ + 1M NaCl | 0.05 M CaCl$_2$ + 1 M NaCl | Good |
| 4% Martinez 470, 1.5% Dowfax XD-8389 | 0.6 – 1.75 M NaCl | 1.9 M NaCl | Good |
| 4% Martinez 470, 1.5% Dowfax XD-8389 | 0.024 – 0.048 M CaCl$_2$ | 0.052 M NaCl$_2$ | Good |
| 4% Martinez 470, 1.5% Dowfax XD-8389 | 0.004 – 0.084 M CaCl$_2$ + 1 M NaCl | 0.090 M CaCl$_2$ + 1 M NaCl | Good |
| 4% Martinez 470, 1.7% Dowfax XD-8214 | 0.3 – 1.05 M NaCl | 1.2 M NaCl | Good |
| 4% Martinez 470, 1.7% Dowfax XD-8214 | 0.008 – 0.016 M CaCl$_2$ | 0.02 M CaCl$_2$ | Moderate |
| 4% Martinez 470, 1.7% Dowfax XD-8214 | 0.004 – 0.008 M CaCl$_2$ + 1 M NaCl | 0.012 M CaCl$_2$ + 1 M NaCl | Moderate |
| 4% Martinez 470, 1.5% Dowfax 2A1 | 0.45 – 1.5 M NaCl | 1.65 M NaCl | Good |
| 4% Martinez 470, 1.5% Dowfax 2A1 | 0.012 – 0.024 M CaCl$_2$ | 0.028 M CaCl$_2$ | Good |
| 4% Martinez 470, 1.5% Dowfax 2A1 | 0.008 – 0.044 M CaCl$_2$ + 1 M NaCl | 0.048 M CaCl$_2$ + M NaCl | Good |

FIG. 1 shows plots of the variations in oil saturations with amounts of fluid injected into oil-containing cores. The cores were cylinders of Berea sandstone 2 inches in diameter and 10 inches long. They contained mixtures of crude oil (at the indicated saturations) with aqueous solutions of 0.025 M NaCl. Each of the surfactant systems contained 4% petroleum sulfonate (Martinez 470), 1.5% aromatic ether polysulfonate (Dowfax XD-8389), and the indicated molar proportions of the indicated electrolytes (as listed in Table 2). As shown, each surfactant system removed all but a relatively small amount of the oil. About 90% of the oil was recovered as a clean oil-phase, with substantially no emulsification until near the end of the experiment. No pressure build-ups occurred during the experiments.

The following examples further typify formulations of the present invention.

EXAMPLE NO. 1

A surfactant system of the present invention for use in a brine-containing sandstone reservoir at 170° F. The reservoir water contains 136,000 ppm total dissolved salts. Most of the dissolved salt is NaCl but 2900 ppm multivalent cations (e.g., calcium and magnesium ions) are present. A source of fresh water (125 ppm TDS) is available for use in preparing the aqueous surfactant system or "chemical slug"..

In this reservoir the chemical slug will undergo mixing with the reservoir water and oil, due to dispersion and crossflow as the slug is moved through the reservoir. It is therefore desirable to formulate the slug so that some mixing with formation water/crude oil can be tolerated without causing a total transfer of surfactant to the oil-phase or causing the formation of two or more aqueous surfactant phases.

Table 3 lists five formulations which were examined for this particular application. Also shown in the table is the volume percent dilution (by mixing with the reservoir water and oil) below which each formulation should be kept in order to avoid the undesired phase behavior described above.

As indicated by the data in Table 3, formulations 2 and 3, which contain NEODOL 25-3S, are subject to change with time as the NEODOL 25-3S slowly hydrolyzes to the corresponding ethoxylated alcohol. At the 170° F temperature of the reservoir, the NEODOL 25-3S will be 50 percent hydrolyzed in about three years and will be 75 percent hydrolyzed in about six years (the minimum time that may be required to flood the reservoir). By the time 75 percent hydrolysis occurs, the NEODOL-containing systems become more sensitive to phase separation upon dilution with formation water than they would have been if NEODOL 25-3S had not been used.

| Petroleum Sulfonate A | 3.58% |
| Dowfax 2A-1 | 1.92% |
| Kelzan MF | 0.10% |
| Fresh Water | 94.4% |

When the so modified formulation was tested by dilution with the 57/43 vol/vol mixture of formation water and oil, no viscous or stable emulsions were formed. Satisfactory tolerance regarding the phase separation criteria was maintained up to a dilution of 57 volume percent. It was unnecessary to incorporate an emulsion control chemical such as isobutanol since the Dowfax material served this function in addition to providing the improved salt tolerance.

EXAMPLE NO. 3

A chemical flooding formulation suitable for use in a reservoir at 95° F. The formation water in the reservoir being considered contained 136,000 ppm total dis- Table 3

| Formulation Number | | 1 | 2 | 3 | 4 | 5 |
|---|---|---|---|---|---|---|
| COMPONENT | | | | | | |
| Petroleum Sulfonate A* | Wt% | 5.97 | 4.78 | 3.58 | 4.78 | 3.58 |
| NEODOL 25-3S | Wt% | 0.00 | 1.20 | 2.41 | 0.00 | 0.00 |
| DOWFAX 2A1 | Wt% | 0.00 | 0.00 | 0.00 | 0.96 | 1.92 |
| Iso Butyl Alcohol | Wt% | 1.20 | 1.20 | 0.80 | 0.80 | 0.80 |
| KELZAN MF | Wt% | 0.00 | 0.08 | 0.10 | 0.10 | 0.10 |
| FRESH WATER | Wt% | 93.13 | 92.74 | 93.11 | 93.36 | 93.60 |
| SALINITY TOLERANCE** | | | | | | |
| Zero Hydrolysis | | 14 | 20 | 48 | 28 | 76 |
| 50% Hydrolysis | | 14 | 15 | 20 | 28 | 76 |
| 75% Hydrolysis | | 14 | 10 | 10 | 28 | 76 |

*Witco TRS 10B, a mixture of petroleum sulfonates having an average equivalent weight of 395.
**Volume percent dilution with 57/43 vol/vol mixture of formation water and crude oil which causes undesired phase behavior.

Formulations 4 and 5 contain Dowfax 2A-1 in lesser amounts than the corresponding NEODOL 25-3S formulations (2 and 3). However, both of the Dowfax 2A-1 systems can tolerate significantly increased dilution before any undesirable phase behavior occurs. Further, since Dowfax 2A-1 is not subject to hydrolysis at the reservoir temperature, the systems containing it retain their tolerance throughout the time required to flood the reservoir.

Formulations 4 and 5 were tested as oil-displacing fluids in Berea cores at 170° F that simulated the above-described reservoir. Continuous injections of these fluids provided recoveries of 88 and 86 percent, respectively, of the oil left in the cores by conventional water floods.

EXAMPLE NO. 2

An alternative chemical flooding formulation suitable for use in a reservoir having properties similar to those given in Example No. 1. A system having tolerance to dilution with the reservoir water and oil (57/43 vol/vol) of 14 volume percent is provided by Petroleum Sulfonate A combined with only Kelzan MF and the available fresh water. But, this system yields viscous and stable emulsions when diluted with formation water and crude oil to the range of 28 to 48 percent. Since both increased tolerance to dilution and an absence of stable viscous emulsions at any dilution are desirable characteristics, a modification was desirable. Dowfax 2A-1 was incorporated into the formulation to give the following composition:

solved salts. Multivalent cations made up 3,000 ppm of this total. No fresh water was readily available. It was determined (by laboratory tests and the like) that Petroleum Sulfonate B (substantially Witco TRS 10–410, a mixture of petroleum sulfonates having an average equivalent weight of 420) was sufficiently active to displace the oil but could not be adequately dispersed in the available saline water. To determine how much of either of such co-surfactants such as Dowfax 2A-1 or NEODOL 25-3S would be required to satisfactorily disperse the sulfonate, the data given in FIG. 2 were obtained.

Figure 2:
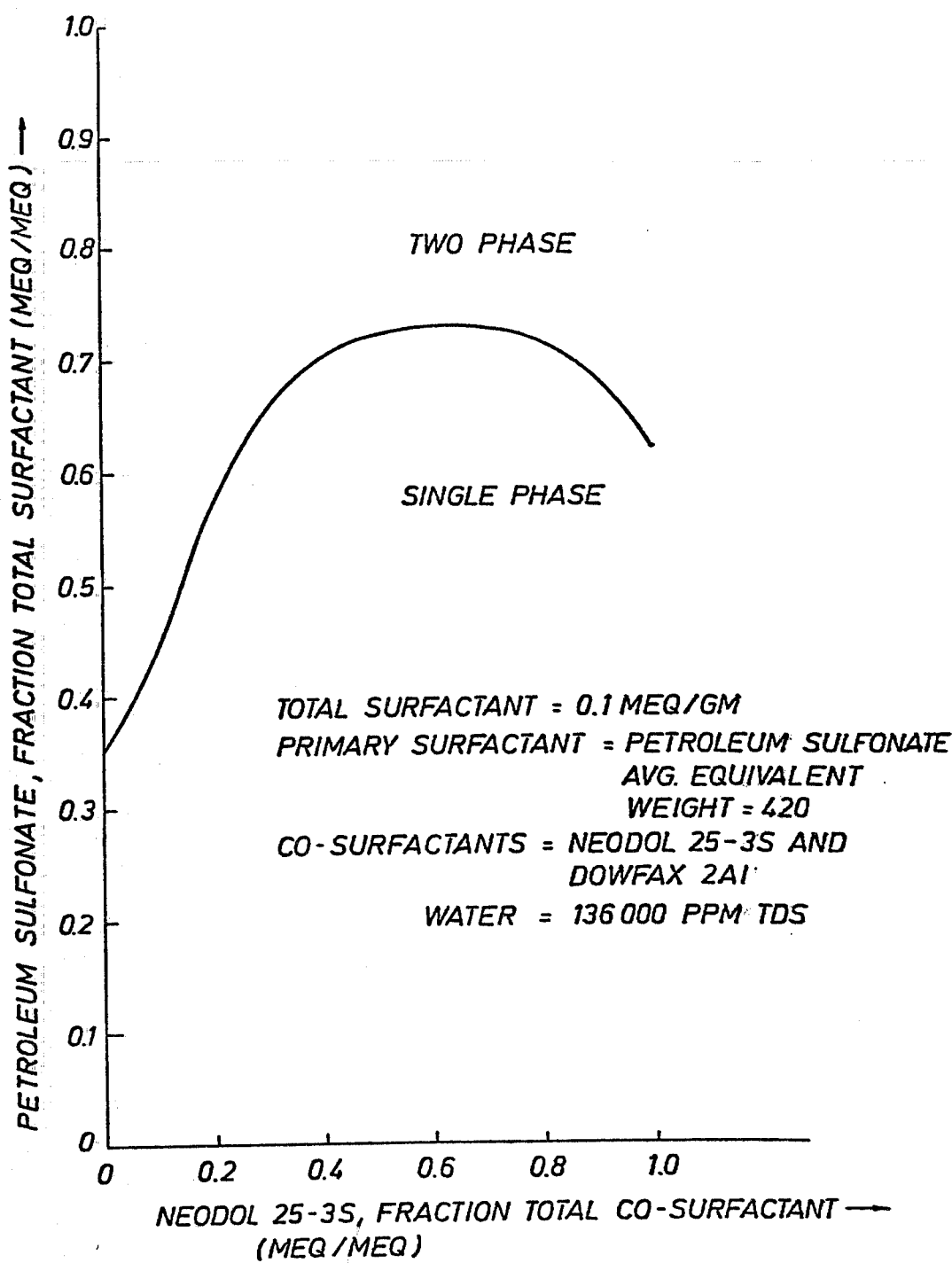
FIG. 2 shows the composition of single-phase formulations in a surfactant system of the present invention.

As shown in FIG. 2, mixtures of Dowfax 2A-1 and NEODOL 25-3S were more effective dispersants or solubilizing agents than either of the individual materials by themselves. When NEODOL 25-3S is used alone, the minimum amount required to just hold the petroleum sulfonate in a uniform single phase dispersion (at a total surfactant concentration of 0.10 meq/gm) is 0.0375 meq/gm. This system contains 0.0625 meq/gm of Petroleum Sulfonate B. Dowfax 2A-1 by itself is not as effective as NEODOL 25-3S at this temperature. The minimum amount of Dowfax 2A-1 required for the 0.10 meq/gm system is 0.065 meq/gm. The petroleum sulfonate concentration is thus only 0.035 meq/gm. Synergism in mixtures of the two dispersing surfactants is illustrated by the fact that a system containing 0.073 meq/gm of Petroleum Sulfonate B can be held in single phase dispersion with 0.0162 meq/gm NEODOL 25-3S and 0.0108 meq/gm of Dowfax 2A-1. In this system, a total Dowfax 2A-1 plus NEODOL 25-3S concentration of 0.027 meq/gm disperses 0.073 meq/gm of petroleum sulfonate. This is a ratio of dispersing surfactant to active oil recovery surfactant of 0.37, which is significantly lower than the ratios of 0.60 and 1.86 needed for the individual dispersing surfactants when used alone.

FIG. 3 shows data from a series of viscosity measurements on surfactant systems similar to those discussed in connection with FIG. 1. They contained 4% Martinez 470, 1.5% Dowfax XD-8389, an aqueous liquid containing 58,500 parts per million sodium chloride (1 mole per liter) and varying amounts of calcium ion (from dissolved calcium chloride). The viscosities were measured at 70° C and 7.3 reciprocal seconds (6 rpm) with a Brookfield viscometer. As shown in FIG. 3, these systems have viscosities ranging from about 3 to 7 throughout a relatively wide range of calcium ion concentrations. Such viscosities are desirable in surfactant systems used to displace oil within a subterranean reservoir.

As known to those skilled in the art, the viscosity of an oil-displacing surfactant system should be relatively high, to provide mobility control and avoid the bypassing of the oil or emulsified mixtures of the oil and the surfactant system. Such a viscosity can be provided by dissolving a water-soluble polymer in the surfactant system. However, the viscosities of commonly used polymer solutions decrease with increasing salt concentration. For example, a 500 parts per million solution of a partially hydrolyzed polyacrylamide polymer (Pusher 700) in distilled water has a viscosity of 46 centipoises. But, in a 1 molar sodium chloride solution, the viscosity of the same proportion of polymer is only 3.6 centipoises. In a solution containing 1,000 parts per million calcium ion, the viscosity decreases to 2.5 centipoises. Those values refer to measurements at room temperature and 7.3 reciprocal second. The capability of the present systems to provide a viscous solution free of polymer can be advantageous in various oil-displacing operations.

What is claimed is:

1. An aqueous anionic surfactant system having a relatively high tolerance to multivalent cations, which system consists essentially of:
   a substantially homogeneous aqueous liquid system containing at least one dissolved or dispersed petroleum sulfonate surfactant, at least one dissolved electrolyte that is predominately an alkali metal salt of a halogen acid, and at least one dissolved sulfonated alkyldiphenyl oxide that contains one ether group attached to the aromatic radicals, contains from 1 to 2 alkyl radicals of from 10 to 16 carbon atoms per molecule, and contains at least substantially two sulfonate groups per molecule;
   within said aqueous liquid system, proportions of the surfactant and electrolyte capable of providing, at a temperature of from about 50° to 300° F, an interfacial tension between the system and an oil of less than about 0.1 dyne per centimeter; and
   within said aqueous liquid system, a proportion of sulfonated alkyldiphenyl oxide which, at temperatures of from about 50° to 300° F, increases the salinity and multivalent cation tolerance of the system and causes the system to be capable of reducing the viscosity and stability of emulsions formed between the system and an oil.

2. The composition of claim 1 in which the anionic surfactant is a mixture of petroleum sulfonates and the electrolyte consists of essentially of sodium chloride.

3. The composition of claim 1 in which the aqueous liquid system contains an ethoxylated aliphatic alcohol sulfate surfactant in an amount substantially equaling the amount of aromatic ether polysulfonate.

4. The composition of claim 1 in which the aqueous liquid system contains a dissolved aqueous liquid thickening agent.

5. The composition of claim 1 in which the aqueous liquid system contains a dissolved emulsion modifier of the group consisting of lower alcohols and polyethoxylated amines.

6. An aqueous anionic surfactant system that has a relatively high tolerance to multivalent cations and is capable of displacing oil when it is injected into a remotely located permeable medium so that it contacts and pushes against the oil, which system consists essentially of:
   a substantially homogeneous aqueous liquid system that contains petroleum sulfonate surfactant molecules or micelles and has a surface tension between it and said oil of less than about 0.1 dyne per centimeter; and
   in said system, a proportion of sulfonated alkyldiphenyl oxide that increases the salinity and multivalent cation tolerance of the system and is capable of reducing the viscosity and stability of emulsions formed between the system and the oil to be displaced, which sulfonated alkyldiphenyl oxide contains one ether group attached to the aromatic radicals, contains from 1 to 2 alkyl radicals of from 10 to 16 carbon atoms per molecule, and contains from about 1.8 to 2 sulfonate groups per molecule.

7. A surfactant system of claim 6 which is capable of effecting said oil displacement at a temperature above about 150° F and is substantially free of alkoxy sulfate multivalent cation tolerance improver.

8. A surfactant system of claim 6 which is preferentially capable of effecting said oil displacement at a temperature less than about 150° F, in which system said sulfonated alkyldiphenyl oxide is mixed with enough ethoxylated aliphatic alcohol sulfate surfactant to provide a surfactant system having a total salinity and multivalent cation tolerance exceeding that of one containing either the sulfonated alkyldiphenyl oxide or the ethoxylated aliphatic alcohol sulfate in the absence of the other.

* * * * *